US012765542B2

(12) United States Patent
Black et al.

(10) Patent No.: US 12,765,542 B2
(45) Date of Patent: Oct. 20, 2026

(54) METHOD FOR MAKING A NONWOVEN MATERIAL WITH REDUCED QUATERNARY AMMONIUM AFFINITY

(71) Applicant: FIBERTEX NONWOVENS A/S, Aalborg Ost (DK)

(72) Inventors: Samuel Keith Black, Gray Court, SC (US); Luis Teixeira, Gray Court, SC (US); Jonathan Layer, Gray Court, SC (US); Jimmy Nicholson, Gray Court, SC (US)

(73) Assignee: FIBERTEX NONWOVENS A/S, Aalborg Ost (DK)

( * ) Notice: Subject to any disclaimer, the term of this patent is extended or adjusted under 35 U.S.C. 154(b) by 243 days.

(21) Appl. No.: 18/708,604

(22) PCT Filed: Oct. 13, 2022

(86) PCT No.: PCT/EP2022/078461
§ 371 (c)(1),
(2) Date: May 9, 2024

(87) PCT Pub. No.: WO2023/104374
PCT Pub. Date: Jun. 15, 2023

(65) Prior Publication Data

US 2025/0031695 A1 Jan. 30, 2025

(30) Foreign Application Priority Data

Dec. 7, 2021 (EP) .................................... 21212717

(51) Int. Cl.
*A01N 25/34* (2006.01)
*A01N 33/12* (2006.01)
(Continued)

(52) U.S. Cl.
CPC ............. *A01N 25/34* (2013.01); *A01N 33/12* (2013.01); *A01P 1/00* (2021.08); *D04H 1/425* (2013.01); *D04H 1/74* (2013.01)

(58) Field of Classification Search
CPC ........... A01N 25/34; A01N 33/12; A01P 1/00; D04H 1/425
See application file for complete search history.

(56) References Cited

U.S. PATENT DOCUMENTS

2013/0039968 A1 2/2013 Messier et al.
2016/0249606 A1 9/2016 Hartgrove et al.
(Continued)

FOREIGN PATENT DOCUMENTS

JP 2019077966 * 5/2019
JP 2019077966 A 5/2019

OTHER PUBLICATIONS

International Search Report and Written Opinion issued in corresponding International Patent Application No. PCT/EP2022/078461 mailed Feb. 9, 2023 (14 pages).

*Primary Examiner* — Nathan T Leong
(74) *Attorney, Agent, or Firm* — Kilyk & Bowersox, P.L.L.C.

(57) ABSTRACT

The invention relates to a method to apply chemistry to nonwovens comprising cellulosic fibers to prevent quaternary ammonium disinfectant binding to the fibers. The invention further relates to nonwovens treated via such method and the improved quaternary ammonium release of the nonwoven, and its use in disinfectant wipes.

18 Claims, 1 Drawing Sheet

(51) Int. Cl.
*A01P 1/00* (2006.01)
*D04H 1/425* (2012.01)
*D04H 1/74* (2006.01)

(56) References Cited

U.S. PATENT DOCUMENTS

2019/0053493 A1 2/2019 Jiang et al.
2020/0002858 A1 1/2020 Steach et al.

* cited by examiner

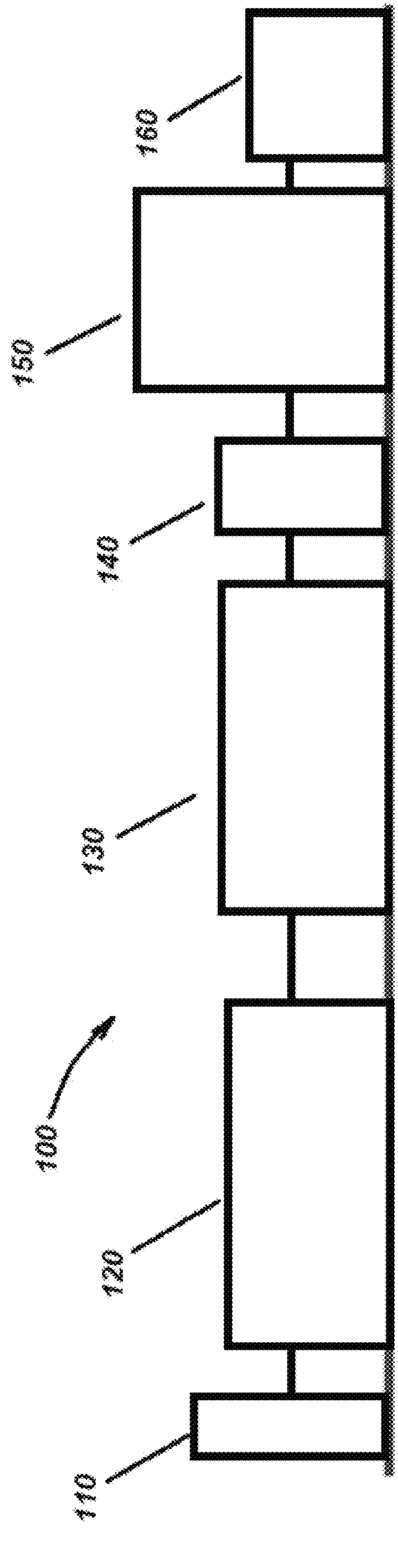
160
150
140
130
100
120
110

METHOD FOR MAKING A NONWOVEN MATERIAL WITH REDUCED QUATERNARY AMMONIUM AFFINITY

This application is a National Stage Application of PCT/EP2022/078461, filed Oct. 13, 2022, which claims priority to European Patent Application No. 21212717.9, filed Dec. 7, 2021.

The invention relates to a method to apply chemistry to nonwovens comprising cellulosic fibers to prevent quaternary ammonium disinfectant binding to the fibers. The invention further relates to nonwovens treated via such method and the improved quaternary ammonium release of the nonwoven, and its use in disinfectant wipes.

Industrial nonwoven wipes are used for a variety of applications in industry and institutions. These products can be wet and may be soaked with chemistry for specific purposes, such as cleaning or disinfection. Wet nonwoven wipes soaked with disinfectant chemistry are known as disinfectant wipes.

Different processes are available for making nonwoven fabrics suitable for use in disinfectant wipes. Common processes use prefabricated staple fibers of certain length that are converted to form a fibrous web by methods like carding, airlaying or wet-laying. Staple fibers can be synthetic fibers or can be of natural origin. The fibrous webs are bonded to form the nonwoven fabric. A popular bonding process is spunlacing, also known as hydroentanglement, which uses fine, high pressure jets of water which penetrate the web, hit the conveyor belt and bounce back causing the fibres to entangle.

As far as the composition of the disinfectant chemistry goes, compositions comprising quaternary ammonium components ("quat") as antimicrobial actives are a popular choice. Quats are positively charged polyatomic ions of the structure $NR^+_4$, R being a hydrocarbon group. Unlike the ammonium ion ($NH^+_4$) and the primary, secondary, or tertiary ammonium cations, the quaternary ammonium cations are permanently charged, independent of the pH of their solution. Many quats, especially those containing long alkyl chains, are used as antimicrobials and disinfectants, show strong antimicrobial efficiency due to their bipolar nature and a consequential destroying effect on bacterial cell walls, virus envelopes, etc. that are formed from lipid bilayers.

Recently, there has been a push in the wipes industry to use cellulosic fibers, which are sustainable, recyclable and compostable, and avoid the use of plastics. Examples of suitable cellulosic fibers include viscose fibers, hemp fibres, cotton fibers and lyocell fibers.

An observed problem in cellulosic fiber based wipes soaked with a quat-based disinfectant is that quats bind to the surface of cellulosic fibers, with the consequence of a rapid decay of efficacy of the disinfectant wipe.

To resolve this issue, fiber manufacturers offer cellulosic fibers that are treated to prevent the quat binding. Treated fibers are expensive and there is a risk that the chemistry is removed by the high pressure jets during hydroentangling of the spunlace process.

Chemistry to prevent the quat binding can also be applied to the finished web, prior to applying the quat disinfectant composition, by standard textile finishing processes, like padding, foam coating, or the like. These methods generally require the fabric to be dry and the processes are performed off-line. In padding, for example, a dry fabric is submerged into a liquid bath and afterwards squeezed to remove excess chemistry. The textile finishing processes add a separate step in production and are consequently very unfavourable in terms of production cost and time.

The present invention aims to address the issues of the prior art and provide a more economical method to produce nonwoven disinfectant wet wipes, which are formed from cellulosic fiber, and contain quats as antimicrobial actives and which do not suffer from a rapid decay of efficacy of the disinfectant over time.

The present invention proposes a method for producing disinfectant wipes, wherein the disinfectant wipes comprise a nonwoven fabric formed from carded fibers that are at least in part cellulosic fibers, and wherein the nonwoven fabric is soaked with a liquid disinfectant composition comprising, as antimicrobial active, at least one quaternary ammonium component. The method comprises the following steps, that are carried out in-line on a production line for forming the nonwoven fabric: continuously forming a fibrous web from staple fibers that comprises cellulosic fibers; continuously bonding the fibrous web to form the nonwoven fabric, wherein the bonding comprises spunlacing; and continuously applying a chemistry effective to inhibit a binding of the quaternary ammonium component to the surface of the cellulosic fibers, wherein the chemistry is applied in a liquid form to the nonwoven fabric while the nonwoven fabric is still wet from spunlacing.

The invention hence involves an in-line process to apply the chemistry to the spunlace material while the nonwoven is still wet. Applying wet chemistry to a wet fabric in-line in a one-step process is a unique method to apply finish to nonwoven fabrics.

The forming of the fibrous web from the staple fibers preferably includes carding. The laydown of fibers on the conveyor of the production line preferably involves cross-laying the carded web.

The staple fibers preferably comprise between 30 wt % and 100 wt % of cellulosic fibers, wherein the remaining fibers, if any, may be synthetic fibers like polyester fibers or polyolefin, for example polypropylene or polyethylene fibers. Examples for suitable cellulosic fibers comprise viscose fibers, cotton fibers, lyocell fibers, hemp fibers, or a mixture thereof.

In one embodiment, the method further comprises an in-line step of continuously and actively drying the fabric after the application of chemistry, wherein the drying preferably comprises passing the fabric through a drying oven.

Preferably, the chemistry is applied to the nonwoven fabric via spray application. Alternatively, applying the chemistry to the wet fabric can be accomplished by foam coating, but that method is limited in terms of application speed.

The speed, at which the fibrous web/nonwoven fabric travels through the production line on the conveyor belt, can be between 100 meters per minute and 250 meters per minute. More preferably, the speed of the line is between 125 meters per minute and 200 meters per minute.

The chemistry, which inhibits binding of the quaternary ammonium component to the surface of the cellulosic fibers, is preferably a liquid suspension of solids containing cations. The liquid suspension can, for instance, include one of the following active components: modified starch such as cationic starch, aluminium acetate or other aluminium salts, sodium carbonate or other alkali or alkali earth sulphates, sulphites, acetates, carbonates, chlorides, hydroxides, phosphates or nitrates, polydiallyldimethylammonium chloride or other quaternary ammoniums such as poly (acrylamide-co-diallylmethylammonium chloride), cyanoguanidine or other ternary amines, cationic polymers such as imidazolium, pyrrolidinium or phosphonium compounds, or a combination thereof.

The solid content of the suspension in one embodiment is between 5 wt % and 30 wt %. The chemistry in its liquid form may be applied to the nonwoven fabric at an amount that equals 5 wt % to 25 wt %, comparing the weight of the chemistry to the total weight of the nonwoven.

The pH of the chemistry is preferably between 6 and 10, and more preferably between 8 and 9, and hence around neutral, which is beneficial in wipes applications for non-corrosiveness and skin tolerability.

Preferably, the added chemistry binds to the surface of the cellulosic fibers either ionically or covalently. These types of bonding avoid issues with release of the chemistry that may be undesirable for environmental and user safety considerations.

In one embodiment, the method further comprises a step of applying the liquid disinfectant composition comprising the quaternary ammonium component to the nonwoven fabric after drying. The fabric is normally wound up to form a fabric roll after its in-line formation and drying, and subsequently unwound before applying the liquid disinfectant off-line. In another embodiment of the present invention, the liquid disinfectant may also be continuously applied in-line after drying and before wind-up.

The invention further relates to a nonwoven fabric formed from carded fibers that are at least in part cellulosic fibers, wherein the nonwoven fabric is produced by the method presented in this invention.

A disinfectant wipe comprising such nonwoven fabric is also subject of the invention. In the disinfectant wipe, the said nonwoven fabric is soaked with a liquid disinfectant composition comprising at least one quaternary ammonium component, and wherein the inhibiting quat binding chemistry is applied to the nonwoven fabric as described in the context of the method above.

The disinfectant wipe according to the invention may be used for wipes applications in general, preferably for sanitary hard surface cleaning, in applications like janitory or medicinal applications.

Further details and advantages of the invention will become apparent from the examples described in the following.

The only FIGURE illustrates a production line 100 for making a nonwoven web in an in-line process involving carding and spunlacing, where chemistry is applied to the wet fabric in agreement with the invention.

The production line 100 comprises a number of stations subsequently arranged. The first station 110 is for fiber preparation and comprises means like a hopper feeder or the like for enabling a uniform feed of staple fibers to carding machine 120. From the carding machine 120, a perforated conveyor belt travels through the subsequent spunlacing station 130, which is followed in-line by a chemistry spray-application station 140 and a drying station 150 before the finished dried nonwoven fabric is wound up onto a roll in a winding station 160 that forms the final station of the production line 100.

The staple fibers preferably comprise between 30 wt % and 100 wt % of cellulosic fibers, such as viscose fibers, cotton fibers, lyocell fibers, hemp fibers, or a mixture thereof. Preferably, the fibers are 100 wt % cellulosic fibers. Alternatively, in order to impart certain function to the fabric, the fibers can be a mix of cellulosic fibers, e.g. 40 wt % to 70 wt % cellulosic fibers, an a remainder of synthetic fibers like polyester fibers or polyolefin fibers like polypropylene or polyethylene fibers.

The carding machine 120 and subsequent spunlacing station 130 can be configured as generally known in the art. The fibers of the fibrous web formed from the laydown in station 120 can be conveyed on a conveyor belt at high speed of, for example, between 125 meters per minute and 200 meters per minute, and be mechanically bonded by means of high energy water jets.

Next in line is the spray-application station 140, which is representative for the key step of the inventive process. The nonwoven fabric formed by spunlacing the fibrous web in station 130, while it is still wet, enters the spray-application station at unchanged travel speed. The spray application station comprises a spray system suitable to uniformly spray-apply at a rate sufficient high to apply a liquid chemistry to the fabric in an amount that equals 5 wt % to 25 wt % of the weight of the dry nonwoven fabric. The chemistry is a suspension of solids effective to inhibit a binding of the quaternary ammonium component to the surface of the cellulosic fibers. The solvent is water and the solids content of the suspension is between 5 wt % and 30 wt %. The pH of the chemistry is at 8,5.

The spray-application station 140 is followed by a drying station 150, which comprises a drying oven through which the wet chemistry loaded nonwoven fabric travels with unchanged speed for drying under elevated temperature, for example between 60° C. and 110° C., and optionally under an airstream moving obliquely or perpendicularly to the direction of fabric travel.

In a final in-line step, the dried nonwoven fabric is wound up to form large rolls of many meters or even kilometres of fabric in winding station 160. The rolls can be stored in a warehouse, shipped to different locations, and unwound for further processing.

An optical Quality control system (not shown in the FIGURE) may be installed between the drying station 150 and the winding station 160.

Off-line and outside the production line 100, the nonwoven fabric is later unwound from the large fabric rolls, soaked with a liquid disinfectant composition comprising one or more quaternary ammonium components, cut into portions appropriate for wipes, packed and shipped to customers. The disinfectant wipes so obtained may be used for sanitary hard surface cleaning.

In experimental tests an improved quat release is measured when comparing a nonwoven fabric produced via the one-step wet on wet treatment application proposed in this invention to a state of the art two-step wet on dry process.

In these tests, 50 gram per square meter nonwoven viscose samples are prepared via the method presented above. The samples are then soaked in a 0.1% alkyl (ethylbenzyl) dimethylammonium chloride solution for 13 hours. The solution is filtered and UV-vis spectroscopy is used to measure the remaining concentration of alkyl (ethylbenzyl) dimethylammonium chloride in the solution.

The positive reference is a 0.1% (=1000 ppm) alkyl (ethylbenzyl) dimethylammonium chloride solution and the negative reference is the solution taken, after incubation for 13 hours, from a 50 gram per square meter viscose nonwoven prepared without the chemical preventing quat binding. CF-2987 provided by Pulcra Chemicals, is used as the chemical preventing quat binding in the inventive and comparative tests. Inventive tests were carried out as explained above in connection with the FIGURE. Comparative tests were carried out in a standard state of the art application on dry web. The results are summarized in Table 1 below:

TABLE 1

| Example # | Kind | Quat* remaining in solution [ppm] |
|---|---|---|
| Comparative A | Positive reference | 1000 |
| Comparative B | Negative reference | 220 |
| Comparative 1 | 23% on dry web | 960 |
| Inventive 1 | 23% on wet web | 1000 |
| Comparative 2 | 12% on dry web | 770 |
| Inventive 2 | 12% on wet web | 810 |

*Quat = alkyl(ethylbenzyl)dimethylammonium chloride

As apparent, there is significant improvement in quat release for the inventive examples vis-à-vis the comparative examples, specifically approx. 5% in inventive example 1 vis-à-vis comparative example 1, and approx. 3.5% in inventive example 2 vis-à-vis comparative example 2.

In yet another embodiment, Stantex F QR 2981 provided by Pulcra Chemicals, is used to prevent quat binding. When applied via the one step wet on wet method described herein, a ratio of 0.05 chemistry to dry nonwoven is enough to achieve 100% quat release (=1000 ppm residual concentration).

Without willingness to be bound by theory, the inventors believe the observed performance enhancement is due to better diffusion of the water-soluble chemistry throughout the wet web. The improved migration of the chemistry yields a better distribution and thus a more uniform layer on the cellulosic material. A more uniform layer results in a better quat release when comparing equal quantity of chemical applied. As the web is still wet from spunlacing, the chemical preventing quat binding can be applied in higher concentrations, as the water, which ensures diffusion already is present in the nonwoven.

The invention claimed is:

1. A method for producing a nonwoven fabric of disinfectant wipes, wherein the disinfectant wipes comprise the nonwoven fabric formed from carded fibers that are at least in part cellulosic fibers, and wherein the nonwoven fabric is soaked with a liquid disinfectant composition comprising, as antimicrobial active, at least one quaternary ammonium component, the method comprising the following steps, that are carried out in-line on a production line for forming the nonwoven fabric:
 - continuously forming a fibrous web from staple fibers that comprises cellulosic fibers;
 - continuously bonding the fibrous web to form the nonwoven fabric, wherein the bonding comprises spunlacing; and
 - continuously applying a chemistry effective to inhibit a binding of the quaternary ammonium component of the liquid disinfectant composition to the surface of the cellulosic fibers, wherein the chemistry is applied in a liquid form to the nonwoven fabric while the nonwoven fabric is still wet from spunlacing.

2. The method of claim 1, wherein the forming of the fibrous web from the staple fibers includes carding.

3. The method of claim 1, wherein the staple fibers comprise between 30 wt % and 100 wt % of cellulosic fibers, wherein the cellulosic fibers are viscose fibers, cotton fibers, lyocell fibers, hemp fibers, or a mixture thereof.

4. The method of claim 1, wherein the method further comprises an in-line step of continuously drying the fabric after the application of chemistry.

5. The method of claim 4, the method further comprises a step of applying the liquid disinfectant composition comprising the quaternary ammonium component to the nonwoven fabric after the drying.

6. The method of claim 4, the method further comprises a step of applying the liquid disinfectant composition comprising the quaternary ammonium component to the nonwoven fabric after the drying, wherein the fabric is wound up to form a fabric roll after the drying and subsequently unwound from the fabric roll before applying the liquid disinfectant off-line.

7. The method of claim 1, wherein the chemistry is applied to the nonwoven fabric via spray application.

8. The method of claim 1, wherein the nonwoven fabric travels through the production line, at least during the in-line application of chemistry, at a speed of between 100 meters per minute and 250 meters per minute.

9. The method of claim 1, wherein the chemistry in its liquid form is a suspension of solids effective to inhibit a binding of the quaternary ammonium component of the liquid disinfectant composition to the surface of the cellulosic fibers.

10. The method of claim 9, wherein solids include one of the following active components: modified starch, aluminium acetate or other aluminium salts, sodium carbonate or other alkali or alkali earth sulphates, sulphites, acetates, carbonates, chlorides, hydroxides, phosphates or nitrates, polydiallyldimethylammonium chloride or other quaternary ammoniums, cyanoguanidine or other ternary amines, cationic polymers, or any combinations thereof.

11. The method of claim 9, wherein solids include one of the following active components: cationic starch, poly (acrylamide-co-diallylmethylammonium chloride), an imidazolium compound, a pyrrolidinium compound, or a phosphonium compound, or any combinations thereof.

12. The method of claim 1, wherein the chemistry in its liquid form is applied to the nonwoven fabric at an amount that equals 5 wt % to 25 wt % of the dry nonwoven fabric.

13. The method of claim 1, wherein the chemistry in its liquid form has a pH value of between 6 and 10.

14. The method of claim 1, wherein the staple fibers comprise between 30 wt % and 100 wt % of cellulosic fibers, wherein the cellulosic fibers are viscose fibers, cotton fibers, lyocell fibers, hemp fibers, or a mixture thereof, and wherein the remaining fibers, if any, are synthetic fibers.

15. The method of claim 1, wherein the staple fibers comprise between 30 wt % and 100 wt % of cellulosic fibers, wherein the cellulosic fibers are viscose fibers, cotton fibers, lyocell fibers, hemp fibers, or a mixture thereof, and wherein the remaining fibers, if any, are polyester fibers or polyolefin.

16. The method of claim 1, wherein the method further comprises an in-line step of continuously drying the fabric after the application of chemistry, wherein the drying comprises passing the fabric through a drying oven.

17. The method of claim 1, wherein the chemistry is applied to the nonwoven fabric via spray application, wherein a rotary spray system is used for the in-line spray-application of chemistry.

18. The method of claim 1, wherein the chemistry in its liquid form is a suspension of solids effective to inhibit a binding of the quaternary ammonium component of the liquid disinfectant composition to the surface of the cellulosic fibers, wherein the solid content of the suspension is between 5 wt % and 30 wt %.

* * * * *